United States Patent [19]

Hartley et al.

[11] Patent Number: 4,853,737

[45] Date of Patent: Aug. 1, 1989

[54] ROLL USEFUL IN ELECTROSTATOGRAPHY

[75] Inventors: Paul A. Hartley, Spencerport; Joseph A. Pavlisko, Pittsford; Hal E. Wright, Rochester, all of N.Y.

[73] Assignee: Eastman Kodak Company, Rochester, N.Y.

[21] Appl. No.: 199,495

[22] Filed: May 31, 1988

[51] Int. Cl.$^4$ ............................................. G03G 15/20
[52] U.S. Cl. .................................. 355/289; 355/279; 355/280; 219/216; 219/388; 430/99; 430/124
[58] Field of Search ............. 355/3 FU, 3 R; 219/216, 219/388; 430/99, 124

[56] References Cited

U.S. PATENT DOCUMENTS

| | | | |
|---|---|---|---|
| 4,257,699 | 3/1981 | Lentz | 355/3 FU |
| 4,264,181 | 4/1981 | Lentz et al. | 358/3 FU |
| 4,272,179 | 6/1981 | Seanor | 355/3 FU |
| 4,314,043 | 2/1982 | Kojima et al. | 525/102 |
| 4,727,394 | 2/1988 | Bov, Jr. et al. | 219/216 X |
| 4,763,158 | 8/1988 | Schlueter, Jr. | 355/3 FU |
| 4,796,049 | 1/1989 | Taniguchi et al. | 355/3 FU |

FOREIGN PATENT DOCUMENTS 764537 8/1967 Canada .
2067471 7/1981 United Kingdom .

Primary Examiner—A. C. Prescott
Attorney, Agent, or Firm—Bernard D. Wiese

[57] ABSTRACT

Rolls with improved properties having an outer layer comprising cured fluoroelastomer containing pendant polydiorganosiloxane segments that are covalently bonded to the backbone of the fluoroelastomer. The outer layer provides a release surface that is abhesive to heat-softenable toner material.

15 Claims, No Drawings

ROLL USEFUL IN ELECTROSTATOGRAPHY

FIELD OF THE INVENTION

This invention relates to a roll that is useful in electrostatography. In one aspect, the invention concerns a fusing roll having an outer layer comprising cured fluoroelastomer in which pendant polydiorganosiloxane segments are covalently bonded to the backbone of the fluoroelastomer to provide a release surface abhesive to heat-softenable toner material.

BACKGROUND

In certain electrostatographic imaging and recording processes such as electrophotographic copying processes, an electrostatic latent image formed on a photoconductive surface is developed with a thermoplastic toner powder which is thereafter fused to a substrate. The fusion step commonly involves directly contacting the substrate, such as a sheet of paper on which toner powder is distributed in an imagewide pattern, with a heated roll. In most instances as the powder image is tackified by heat, part of the image carried by the sheet sticks to the surface of the roll so that as the next sheet is advanced, the tackified image partially removed from the first sheet partly transfers to the next sheet and at the same time part of the tackified image from the next sheet adheres to the heated roll. Any toner remaining adhered to the heated surface can cause a false offset image to appear on the next sheet that contacts the fusing roll and can also degrade the fusing performance of the fusing surface.

To prevent toner offset, many expedients have been tried such as providing the fusing roll with an abhesive surface such as a thin coating of an elastomer, e.g., a fluoroelastomer, or a silicone polymer of low surface energy. Also polymeric release oils, e.g., polydiorganosiloxane release oils such as polydimethylsiloxane release oils have been applied to the fuser roll surfaces. With such materials, however, problems can occur. One problem is that the elastomers and silicone polymers are difficult to wet with polymeric release oils and the application of excessive amounts of such oils to the surfaces of fuser rolls in order to achieve sufficient surface wetting can cause oil stains on the paper to which toner is being fused.

U.S. Pat. Nos. 4,264,181 and 4,272,179 describe fuser rolls having surfaces comprising fluoroelastomers and metal-containing fillers that provide sites that react with functionalized polymeric release agents such as mercapto-functional polydiorganosiloxane release agents to provide a surface abhesive to toner materials and reduce toner offset. Unfortunately, as such fuser rolls wear, fresh active sites that are exposed react not only with the functionalized polymeric release agents but also react with various components of the toner materials and the paper substrate. Such reaction builds up debris on the surface of the fuser roll which results in permanent damage to such surface. This greatly reduces the life of the fuser roll. Additionally, the metal-containing filler particles are physically torn from the fuser surface during use which also reduces the life of the fuser roll. It is evident, therefore, that there is a need in the prior art for a roll that is not subject to the problems described hereinbefore and exhibits improved resistance to offset and increased useful fusing life. An objective of this invention is to provide such a fusing roll.

SUMMARY OF THE INVENTION

The present invention provides a roll useful for fusing heat-softenable toner material to a substrate. The roll has an outer layer comprising cured fluoroelastomer having pendant polydiorganosiloxane segments that are covalently bonded to the backbone of the fluoroelastomer. Such segments have a number average molecular weight in the range of about 1,000 to 20,000.

The outer layer described provides a release surface which minimizes toner offset. This release surface is achieved without significant sacrifice in the desirable physical properties, for example, physical strength of the fluoroelastomer. Furthermore, as illustrated in the following Examples, incorporation of a relatively small concentration of the pendant polydiorganosiloxane segments into the fluoroelastomer in accordance with this invention achieves an increase in the life of a fuser roll well beyond that which could reasonably be expected for such a seemingly small modification. In addition, the incorporation of the pendant polydiorganosiloxane segments into the fluoroelastomer can serve as an internal lubricant that reduces the overall wear of the surface of a fuser roll, a potential initiating step to toner offset. Additional advantages will be described hereinafter.

DESCRIPTION OF PREFERRED EMBODIMENTS

The cured fluoroelastomers that are used in the practice of this invention are obtained by covalently bonding polydiorganosiloxane segments to the backbone of a non-cured fluoroelastomer. Such segments are appended to the backbone of the cured fluoroelastomer as opposed to being an integral part of that backbone as would be the case in a random or block copolymer comprising fluorocarbon moieties. Accordingly, these polydiorganosiloxane segments are frequently referred to herein as being pendant polydiorganosiloxane segments. The non-cured or non-crosslinked fluoroelastomer base polymers that are modified by the incorporation of the pendant polydiorganosiloxane segments are known materials and have been used in the preparation of fuser roll surfaces. See, for example, U.S. Pat. Nos. 4,257,699; 4,264,181; and 4,272,179. The required diorganosiloxane segments can be conveniently appended to the backbone of the cured fluoroelastomer during curing of the fluoroelastomer base polymer by simply adding to the composition to be cured, a polydiorganosiloxane oligomer containing appropriate functional groups such as phenoxy or amino groups. At least one of these functional groups must be present on a polydiorganosiloxane chain in the oligomer to form the covalent bond the the fluoroelastomer backbone. Such groups react with the fluoroelastomer base polymer as a result of dehydrofluorination of the base polymer which take place during curing. Fluoroelastomer base polymers that can be used are polymers of ethylenically unsaturated fluorohydrocarbons. Fluoroelastomers derived from many of these fluorohydrocarbons, including vinylidene fluoride, hexafluoropropylene and perfluoroalkylvinyl ethers are commercially available from a number of suppliers and generally have glass transition temperatures (Tg) in the range of about 0° to 10° C. Useful fluoroelastomers are vinylidene fluoride-based fluoroelastomers which contain hexafluoropropylene as a comonomer. Two classes of suitable fluoroelastomers are (1) copolymers of vinylidene fluoride and hexafluoropropylene, known commercially as Viton A, and (2)

terpolymers of vinylidene fluoride with hexafluoropropylene and tetrafluoroethylene, known commercially as Viton B. Viton A and Viton B are trademarks of E. I. duPont & Co.

The fluoroelastomer base polymers can be cured using a basic nucleophile cure system of the type described in U.S. Pat. Nos. 4,257,699, 4,264,181, and 4,272,179 referred to previously herein. Such a cure system generally employs a bifunctional agent such as a bisphenol or a diamine carbamate to generate a covalently crosslinked polymer network formed by the application of heat following basic dehydrofluorination of the polymer. The basic dehydrofluorination reaction requires the presence in the formulation being cured of a basic metal oxide such as magnesium oxide, calcium oxide or lead oxide. The basicmetal oxide reacts with acidic by-products that are believed to include hydrogen fluoride and/or derivatives thereof, that are generated during curing of the fluoroelastomer. The incorporation of a polydiorganosiloxane oligomer containing appropriate reactive groups with the essential ingredients of a basic nucleophilic addition curing system results in covalently bonding pendant polydiorganosiloxane segments to the backbone of the fluoroelastomer base polymer while it is being cured. Depending upon the number of the reactive groups on the polydiorganosiloxane oligomer the pendant segments can form branches on the fluorocarbon backbone of the fluoroelastomer base polymer and/or enter into the crosslink network of the cured fluoroelastomer. The primary reactions involved in the basic nucleophile curing system described in the aforementioned three U.S. Patents are also disclosed and discussed in various journals and articles including a paper entitled "Viton Fluoroelastomer Crosslinking by Bisphenols" written by W. W. Schmiegel and presented at the South German Meeting of the Deutsche Dautshuk Und Gummi Gesellschaft, Apr. 28–29, 1977. One example of the nucleophilic addition cure system is the bisphenol crosslinking agent with organophosphonium salt accelerator. The phosphonium salt may be exemplified as:

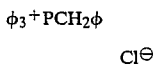

where $\phi$ represents phenyl groups, and the bisphenol is exemplified as:

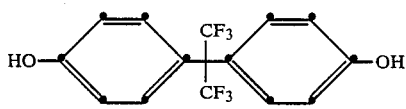

Another example of the nucleophilic addition cure system is crosslinking with a diamine carbamate type curing agent commonly known as DIAK 1. The following scheme showing three separate reactions represents the curing of copoly(vinylidene fluoride-hexafluoropropylene) with diamine carbamate as the curing or crosslinking agent:

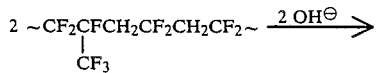

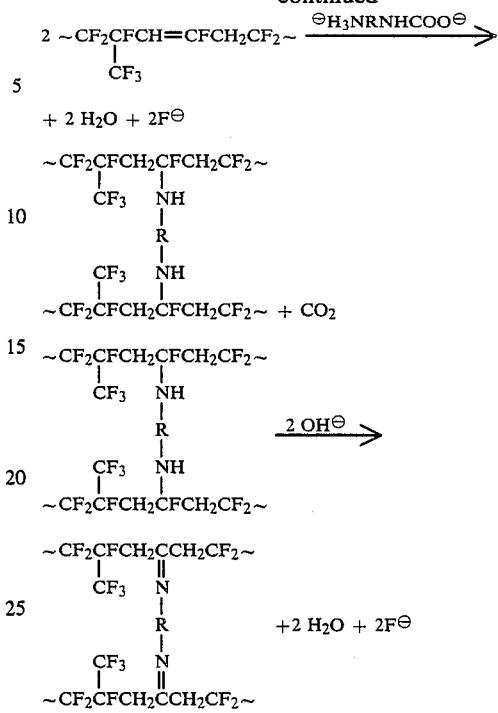

where step 1 shows the loss of HF in the presence of a base; step 2 shows the insertion of the diamine carbamate agent; and step 3 shows post cure in the presence of heat. This mechanism is well known in the art as a crosslinking or curing system. Examples of diamine carbamate cure systems are hexamethylenediamine carbamate known commercially as DIAK No. 1 and N,N′-dicinnamylidene-1,6-hexanediamine known commercially as DIAK No. 3 (DIAK is a trademark of E. I. duPont & Co.).

A critical feature of the cured fluoroelastomers employed in the practice of this invention is that they comprise a backbone having pendant polydiorganosiloxane segments covalently bonded thereto. Such cured fluoroelastomers exhibit superior properties in fuser rolls in comparison to cured fluoroelastomers of the prior art that do not contain such segments. Thus, such segments provide an "internal lubricant" for the fuser surface which is adhesive to heat-softenable toner materials. Such an internal lubricant provides a relatively low surface energy coating for the fuser roll and facilitates uptake and wetting of release fluids that are applied to the fusing surface. The polydiorganosiloxane segments can be covalently bonded to the backbone of the cured fluoroelastomer by any method known to the prior art to be suitable for this purpose. However, using a basic nucleophilic addition curing system as previously described herein, is a very convenient method of incorporating the polydiorganosiloxane segments into the cured fluoroelastomer backbone. The desired cured fluoroelastomer can be synthesized by reacting a polyfunctional diorganosiloxane oligomer, for example, a diaminoalkyl-terminated oligomer with the non-cured fluoroelastomer during the cure cycle. Suitable polydiorganosiloxanes include the homo and copolymers that are well known and can be selected by those skilled in the art to provide the optimum release properties using at most, only minimum routine experimentation. Typically the organo groups in the oligomers are normally free of aliphatic unsaturation and include such radicals as alkyl, e.g., methyl, ethyl, propyl, octyl; cycloalkyl, e.g., cyclopentyl and cyclohexyl; aryl, e.g., phenyl; aralkyl, e.g., benzyl and halogenated derivatives of the aforementioned radicals, e.g., chloromethyl, trifluoromethyl, dibromophenyl and tetrachlorophenyl. Although the polydiorganosiloxane oligomer employed can be any oligomer that is compatible with the curing composition and which yields cured fluoroelastomer containing the desired polydiorganosiloxane segments, the preferred oligomers are α,ω- difunctional polydiorganosiloxanes such as bis(aminopropyl)terminated poly(dimethylsiloxanes). Such oligomers are available in a series of molecular weights as disclosed, for example, by Yilgor et al, "Segmented Organosiloxane Copolymers", Polymer, 1984, V. 25, pp. 1800–1806 and in a treatise entitled "Block Copolymers" by Noshay and McGrath, Academic Press (1977), pages 392–428. They are prepared, as described by McGrath et al by the ring opening equilibration of octamethylcyclotetrasiloxane in the presence of 1,3-bis(3-aminopropyl)tetramethyldisiloxane and an initiator. A preferred class of polydiorganosiloxane oligomers, based upon availability, includes those having functional groups including amines, phenols and thiols which provide the covalent bonding with the backbone of the cured fluoroelastomer. Examples of such oligomers that can be used in the practice of this invention can be represented by the following general formula:

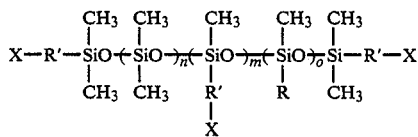

where

R is lower alkyl or haloalkyl such as methyl, ethyl, fluoropropyl or aryl such as phenyl;

R' is lower alkylene such as methylene, ethylene or isopropylene or arylene such as phenylene;

X is a functional group having an active hydrogen such as —OH, —NH$_2$, —NR''H, —SH, —NHCO$_2^{74}$, where R'' is hydrogen or lower alkyl.

n, m and o are positive integers such that n+m+0 provides a number average molecular weight (Mn) in the range of about 1,000 to 20,000, often about 2,000 to 14,000. The number average molecular weight (Mn) of the uncured fluoroelastomer used in this invention is generally in the range of about 75,000 to 125,000, often about 100,000.

The number average molecular weight of the polydiorganosiloxane segments in the cured fluoroelastomer is, as previously indicated herein, about 1,000 to 20,000. At lower molecular weights, no appreciable release effect is observed and at higher molecular weights, the physical strength of the elastomer shows significant deterioration. A suitable concentration of polydiorganosiloxane segments in the cured fluoroelastomer which provides the desired release surface on the roll is generally about 1 to 10, often 3 to 7 weight percent. To achieve such weight percents, up to 15 percent, by weight, generally about 5 to 10 percent, by weight of the polydiorganosiloxane oligomer is added to the formulation to be cured. This latter concentration is based upon the total weight of the formulation, including non-cured fluoroelastomer, catalyst, filler and other materials present in the formulation.

The outer layer of the roll of this invention can also contain a filler or mixture of fillers. Such fillers are well known in the prior art and are conventionally used with fluoroelastomers at concentrations in the range of about 10 to 100, often 25 to 75 weight percent, based on the weight of the cured fluoroelastomer. Suitable fillers include reinforcing fillers such as carbon that improve the physical or thermal properties of the layer. A particularly useful filler is a metal-containing filler such as a metal, metal alloy, metal salt or metal oxide that reacts with polymeric release agents that have functional groups and are applied to the fuser roll surface to provide a surface adhesive to heat-softenable toner materials. The interaction between the metal-containing fillers and such polymeric release agents which are in the form of a liquid or fluid provides an excellent surface for release coupled with a propensity of the release agent to remain upon the surface of the fuser roll. This interaction, the fillers and the polymeric release agents having functional groups are well known in the art and are described in detail in several U.S. Patents including U.S. Pat. Nos. 4,257,699, 4,264,181, and 4,272,179. However, a description of such materials at this point may be useful to provide a better understanding of the invention.

The metal oxide, metal salt, metal, metal alloy or other metal compound fillers which are used to provide active sites to interact with the release oils or fluids, will vary depending upon the particular polymeric release agent having functional groups used in a fusing assembly. The general classes of metals which are applicable include those metals of Groups 1$b$, 2, 3, 4, 5, 6$b$, 7$b$ and 8 and the rare earth elements of the Periodic Table. In certain instances, especially in salts and alloys, certain metals of group 1$a$ of the Periodic Table are also included.

The metal oxide filler can be any metal oxide that can be incorporated into the cured fluoroelastomer without adverse effect upon the fluoroelastomer or upon the polymer release agent having functional groups. For example, the advantages described herein can be obtained when the metal oxide filler dispersed in the cured fluoroelastomer is an oxide of aluminum, copper, tin, zinc, lead, iron, platinum, gold, silver, antimony, bismuth, iridium, ruthenium, tungsten, manganese, cadium, mercury, vanadium, chromium, magnesium, nickel and alloys thereof. One skilled in the art can compare the release of various cured fluoroelastomers containing these metal oxides to determine the optimum metal oxide or combination thereof and concentrations thereof. For example, when the polymeric release agent is one having mercapto functional (thio functional) groups, the preferred metal-containing fillers, are those that interact with the sulfur in the mercapto-functional group to form metal sulfides. Metal oxide fillers such as lead oxide that also take part in the basic dehydrofluorination reaction during curing of the fluoroelastomer base polymer are often preferred because their use in the curable composition eliminates the need for a second filler that will interact with the polymeric release agents that have functional groups. In those embodiments where thermal conductivity is of significance, preferred metal oxide fillers are those which have greater thermal conductivity. Thus, more desirable metal oxide fillers dispersed in the cured fluoroelastomer may comprise copper, silver or gold.

When metal fillers are used, any stable metal or metal alloy may be used as long as there is no adverse effect upon the cured fluoroelastomer or the polymeric release agent having functional groups and as long as the metal or metal alloy interacts with the functional group or groups of the polymeric release agent. Exemplary of the metal or metal alloy fillers useful in the present nvention are aluminum, copper, tin, zinc, lead, beryllium, iron, platinum, gold, silver, iridium, ruthenium, tungsten, vanadium, cadmium, chromium, manganese, magnesium, bismuth, antimony, nickel and alloys of the foregoing metals.

Metal salts may also be used in accordance with the present invention. Any stable salt or salts of the metals discussed relative to their location in the Periodic Table of Elements capable of interacting with the functional group or functional groups of the polymeric release agent may be used as a filler as long as there is no adverse effect upon the cured fluoroelastomer or the polymeric release agent having functional groups. For example, when the functional group of the polymeric release agent is hydroxyl, then the metal salt must interact with the oxygen in the hydroxyl group to form a metal-oxygen interaction product. Exemplary of some of the metal salts useful in the present invention are the acetates, halides (chlorides, fluorides, iodides, and bromides), carbonates, sulfides, sulfates, phosphates, or nitrates of lithium, sodium, potassium, calcium, iron, nickel, copper, zinc, aluminum, cadmium, silver, lead, tin, gold, chromium, or tungsten. Preferred metal salts are the salts of heavy metals that are highly insoluble in the polymer release agent since there is less tendency for such salts to dissolve in such release agent and produce an adverse effect such as gelation.

The rolls of this invention can be used with conventional release agents (oils or fluids) that are normally applied to the active surface of a fuser roll to enhance toner release. Such materials include, for example, silicone fluids of both low and high viscosity and poly(dimethylsiloxane) oils. The preferred class of release agents are polymeric release agents having functional groups since such release agents can be used in conjunction with fuser rolls containing the metal-containing fillers to achieve the advantages described previously herein. Suitable release agents include those described in U.S. Pat. Nos. 4,029,827, 4,078,285, 4,011,362, 4,101,686, and 4,046,795, 4,257,699, 4,264,181 and 4,272,179.

The outer layer that forms the working surface of the roll of this invention comprises the cured fluoroelastomer and optionally conventional addenda such as antioxidants, stabilizers and release agents that further reduce the adhesion of heat-softenable toner material to a fuser roll. Examples of such release agents are poly(tetrafluoroethylene), boron nitride and fluorinate graphite. Such release agents can be blended with the non-cured fluoroelastomer in a concentration of about 5 to 25 weight percent. This outer layer is generally about 15 to 75 μm, often about 20 to 30 μm thick.

The roll of this invention comprises a cylindrical core coated with one or more layers, including the outer layer or working surface of this invention. A suitable core comprises any rigid metal or plastic substance, including, for example, aluminum, steel, and various alloys and polymeric materials such as thermoset resins, with or without fiber re-enforcement.

The fuser roll can be fabricated by first preparing a mixture of the non-cured fluoroelastomer and any other addenda such as fillers and release agents desired to be included in the working surface of the roll. The mixture is blended on compounding rolls to achieve a homogeneous blend. The resulting blend is then dispersed in a suitable solvent such as methylethylketone or methylisobutyl ketone. The polydiorganosiloxane oligomer in the form of a liquid or oil is added to the dispersion.

The composition is then coated on a suitable substrate to form the outer layer of the fuser roll. The coating can be achieved using any convenient technique including gravure or spray coating. The substrate can be an aluminum or steel cylinder and it can comprise primer or other underlayers well known in the art. One skilled in the art can easily select one of the many well known adhesives or primers available for adhering particular fluoroelastomrs to substrates. Also, a wide variety of underlayers are well known for use in fuser rolls, for example, as resilient layers that aid in forming a suitable nip for the production of high quality copies.

The outer layer is permitted to dry in air to remove volatile solvents and is then subjected to nucleophilic addition curing as described previously herein. It is during this curing period that the polydiorganosiloxane segments covalently bond to the backbone of the fluoroelastomer. The curing treatment is preferably carried out, at least in part, at temperatures of at least 230° C. The curing treatment can be carried out in stages, for example, an initial state where the temperature of the composition is ramped (gradually raised) from about 20° C. to about 230° C. over a period of about 12 to 24 hours and then cured at that temperature or slightly higher, e.g., 232° C. for about 24 hours.

The outer layer comprising cured fluoroelastomer having pendant diorganosiloxane segments, as described herein, can be applied to a roll other than a fuser roll to provide a release surface that is abhesive to heat-softenable toner materials that may come into contact with such a roll. For example, fuser rolls of the type described herein are typically used in a pressure fusing system where the fuser roll and a pressure roll (also referred to as a backup roll) define a contact arc between the rolls wherein toner images are fused to a substrate. In such a system an applicator roll (also referred to as an oiling roll) may be used to apply release agent to the outer layer or working surface of the fuser roll to prevent toner offset. Such pressure or applicator rolls can comprise an outer layer of the cured fluoroelastomer having pendant polydiorganosiloxane segments to provide the desired release surface.

Rolls of this invention have been used as fuser rolls and have also been tested to determine various physical properties thereof. When used as fuser rolls, with application of heat and various release fluids thereto, the rolls have exhibited good fusing performance and durability over long copy runs. Furthermore, it has been found that the type of polydiorganosiloxane segments that are covalently bonded to the backbone of the cured fluoroelastomer can be adjusted to make them structurally compatible with organosiloxane polymeric units present in many release oils so that the segments absorb a limited and controlled amount of release oil. The benefit of this is that the outer layer of the fusing roll serves as a reservoir for release oil in the event of any interruption in the normal supply of release oil to the surface of the roll. If such oil supply is interrupted, the oil retained by the fusing roll outer layer of this invention prevents any immediate image defects, which would normally occur when a non-absorbing polymer such as a prior art cured fluoroelastomer is used as a fusing surface. Also, the aforementioned compatibility allows the polymeric release agent to be more intimately bound to the surface of the fuser roll then would be the case where no polydiorganosiloxane segments are present in the cured fluoroelastomer.

Likewise, because of its balanced polydiorganosiloxane segment content, the entire surface of the fuser roll is readily wetted by a reasonably small amount of release oil. In contrast, a covering such as a prior art fluoroelastomer which is more incompatible with release oil, requires an excessive amount of the oil to cover its surface. As a consequence of having to use so much oil to obtain release of the heat-softenable toner material, the oil stains the paper on which toner is being fused by the fuser roll.

It is particularly advantageous to have polydiorganosiloxane segments present in the fuser rolls of this invention when such rolls also contain metal-containing fillers and are used in conjunction with polymeric release agents containing functional groups that interact with such fillers. Thus, the polydiorganosiloxane segments provide a boundary layer on the surface of the fuser roll which prevents toner material from contacting the high energy metal containing fillers to form reaction products that build up on the surface of the fuser roll and reduce its useful life.

The fusing rolls of this invention are used for fusing heat-softenable toner materials of the type that are well known and have the physical properties required in dry electrostatographic toner materials. Such toner materials or particles can be thermally fixed or adhered to a receiving sheet such as paper or plastic. These termal fixing techniques are well known in the art.

Many polymers have been reported in literature as being useful in dry electrostatographic toners. Polymers useful in such toners include vinyl polymers, such as homopolymers and copolymers of styrene and condensation polymers such as polyesters and copolyesters. Fusible styrene-acrylic copolymers which are covalently lightly crosslinked with a divinyl compound such as divinylbenzene, as disclosed in the patent to Jadwin et al, U.S. Re Pat. No. 31,072, are useful. Also useful are polyestes of aromatic dicarboxylic acids with one or more aliphatic diols, such as polyesters of isophthalic or terephthalic acid with diols such as ethylene glycol, cyclohexane dimethanol and bisphenols. Examples are disclosed in the patent to Jadwin et al.

Fusible toner particles used in this invention can have fusing temperatures in the range from about 50° C. to 200° C. so they can readily be fused to paper receiving sheets. Preferred toners fuse in the range of from about 65° C. to 120° C. If the toner transfer is made to receiving sheets which can withstand higher temperatures, polymers of higher fusing temperatures can be used.

Useful toner particles can simply comprise the polymeric particles but, it is often desirable to incorporate addenda in the toner such as waxes, colorants, release agents, change control agents, and other toner addenda well known in the art.

If a colorless image is desired, it is not necessary to add colorant to the toner particles. However, more usually a visibly colored image is desired and suitable colorants selected from a wide variety of dyes and pigments such as disclosed for example, in U.S. Reissue Pat. No. 31,072 are used. A particularly useful colorant for toners to be used in black-and-white electrophotographic copying machines is carbon black. Colorants in the amount of about 1 to about 30 percent, by weight, based on the weight of the toner can be used. Often about 1 to 8 percent, by weight, of colorant is employed.

Charge control agents suitable for use in toners are disclosed for example in U.S. Pat. nos. 3,893,935; 4,079,014; 4,323,634 and British Patent Nos. 1,501,065 and 1,420,839. Charge control agents are generally employed in small quantities such as, about 0.1 to about 3, weight percent, often 0.2 to 1.5 weight percent, based on the weight of the toner.

Toners used with a roll of this invention can be mixed with a carrier vehicle. The carrier vehicles, which can be used to form suitable developer compositions, can be selected from a variety of materials. Such materials include carrier core particles and core particles overcoated with a thin layer of film-forming resin. Examples of suitable resins are described in U.S. Pat. Nos. 3,547,822; 3,632,512; 3,795,618; 3,898,170; 4,545,060; 4,478,925; 4,076,857; and 3,970,571.

The carrier core particles can comprise conductive, non-conductive, magnetic, or non-magnetic materials. See, for example, U.S. Pat. Nos. 3,850,663 and 3,970,571. Especially useful in magnetic brush development schemes are iron particles such as porous iron particles having oxidized surfaces, steel particles, and other "hard" or "soft" ferromagnetic materials such as gamma ferric oxides or ferrites, such as ferrites of barium, strontium, lead, magnesium, or aluminum. See for example, U.S. Pat. Nos. 4,042,518; 4,478,925; and 4,546,060.

A typical developer composition containing toner particles and carrier vehicle generally comprises about 1 to 20 percent, by weight, of particulate toner particles and from 80 to 99 percent, by weight, carrier particles. Usually, the carrier particles are larger than the toner particles. Conventional carrier particles have a particle size on the order of about 20 to 1200 micrometers, generally about 30 to 300 micrometers. Alternatively, the toners can be used in a single component developer, i.e., with no carrier particles.

Typical toner particles generally have an average diameter in the range of about 0.1 to 100 $\mu$m, a value of about 2 to 20 $\mu$m being particularly useful in many current copy machines.

The following preparations and examples are included to illustrate the preparation and superior properties of rolls made in accordance with this invention. Parts and percentages are by weight unless otherwise specified.

Roll Preparation

Cylindrical aluminum cores were cleaned, washed to remove contaminants and coated with a conventional silicone priming agent. the primed cores were dried and coated with a layer of polydimethylsiloxane elastomer which was then cured to provide a resilient underlayer having a dry thickness of 2.5 millimeters. The roll was surface ground, and cured again. After curing, the underlayer was treated to improve adhesion of the outer layer that forms a fusing surface according to this invention.

The outer layer or fusing surface was prepared using a fluoroelastomer-based composition described in the following Examples. The composition comprising uncured fluoroelastomer base polymer, polydiorganosiloxane oligomer, pigment, fillers and curing agents was compounded on a 2-roll mill until a uniform blend was obtained.

The blend was then dispersed in methyl ethyl ketone solvent with stirring for a minimum of 2 hours. The dispersion was stirred slowly to avoid settling, kept sealed to prevent solvent loss and exposure to atmosphere moisture, and then roll coated on the resilient underlayer at a temperature of 21° C. (Relative Humidity 50%), to form an outer layer having a dry thickness of 30 micrometers. This outer layer was cured using the following conditions:

Air dry 24 hours
24 hours ramp to 232° C.
24 hours at 232° C.

The fuser rolls were "preconditioned" before they were used to thermally fix toner particles. This preconditioning was achieved by rotating the fuser roll in contact with an aluminum pressure roll. These rolls were coated with a silicone release oil Silicone Fluid F655B, a mercapto functional polydimethylsiloxane having a viscosity of 10,000 centistokes at 25° C. (available from Stauffer-Wacker Silicone Corp.) by means of a rotating wick for 10 minutes. The wick was disengaged and the fuser roll was rotated in contact with the pressure roll for 4 hours at 188° C. The fuser roll was ready to use.

The following examples further illustrate the invention.

EXAMPLE 1

As previously indicated, the fuser rolls of this invention exhibit excellent fuser life and resistance to offset. To illustrate these features, the following composition was prepared, coated and cured to form the outer layer of a fusing roll according to the Roll Preparation procedure described hereinbefore.

| Component | Grams |
| --- | --- |
| Copoly(hexafluoropropylene-vinylidene fluoride) number average molecular weight 100,000 (available from E. I. duPont & Co. as Viton A) | 100 |
| Benzyltriphenylphosphonium chloride curing agent (available from E. I. duPont & Co. as Cure 20) | 4.5 |
| 4,4'-(2,2,2-trifluoro-1-(trifluoromethyl)-ethylidene)bisphenol curing agent (available from E. I. duPont Co. as Cure 30) | 6 |
| Magnesium oxide | 3 |
| Calcium hydroxide | 6 |
| Carbon black (available as Thermax MT from R. T. Vanderbilt Co.) | 45 |
| $\alpha,\omega$-aminopropyl terminated polydimethylsiloxane oligomer, number average molecular weight 8,000 | 5 |
| Methyl ethyl ketone | 994 |

The fuser roll was used in the fuser assembly of an Ektaprint 250 Duplicator (trademark of Eastman Kodak Company) to fix an image of dry toner particles comprising yellow pigment, charge agent and polyester binder (a polyester of terephthalic acid/glutaric acid (87/13, weight percent) and 1,2-propanediol/glycerol (95/5, weight percent). The fusing conditions and release oil were as follows:

| | |
| --- | --- |
| Fuser roll temperature | 171° C. |
| Pressure roll temperature | 171° C. |
| Release oil | mercapto-functional polydimethylsiloxane oil ($1.4 \times 10^{-4}$ equivalents mercapto/gram fluid), viscosity 275 centistokes at 25° C. |

Approximately 10,000 copies were fused with no evidence of hot offset. This illustrates the excellent offset resistance of fuser rolls of this invention.

After 45,000 copies, the fuser roll surface was analyzed for polyester buildup. Such buildup is evidence of reaction between the roll surface and the polyester binder resin in the toner. A Fourier Transform Infrared analysis technique was used to determine carbonyl absorption on the roll surface. With this technique, values are reported in terms of units of infrared absorption per square millimeter of roll surface, i.e., the negative log of the reciprocal of light transmission. The larger the number, the greater the concentration of carbonyl on the roll surface and the shorter the usable life of the roll. The infrared absorption per square millimeter for the fuser roll of this invention was 2. In contrast, a roll identical in all respects except that the $\alpha,\omega$-aminopropyl terminated polydimethylsiloxane oligomer was omitted from the composition, had an infrared absorption per square millimeter of 7. This reduction in polyester buildup clearly illustrates that the use of cured fluoroelastomers having pendant polydiorganosiloxane segments covalently bonded to the backbone of the fluoroelastomer in fuser rolls of this invention significantly increases the useful life of such rolls.

EXAMPLE 2

As indicated previously, metal-containing fillers such as lead oxide can be used in the practice of this invention. To illustrate, Example 1 was repeated with the following composition.

| Component | Grams |
| --- | --- |
| Copoly(hexafluoropropylene vinylidene fluoride) number average molecular weight 100,000 (available from E. I. duPont & Co. as Viton A) | 100 |
| Benzyltriphenylphosphonium chloride curing agent (available from E. I. duPont & Co. as Cure 20) | 2.5 |
| 4,4'-(2,2,2-trifluoro-1-(trifluoromethyl)-ethylidene)bisphenol curing agent (available from E. I. duPont & Co. as Cure 30) | 6 |
| Lead monoxide | 15 |
| Carbon black (available as Thermax MT from R. T. Vanderbilt Co.) | 20 |
| $\alpha,\omega$-aminopropyl terminated polydimethylsiloxane oligomer, number average molecular weight 8,000 | 5 |
| Methyl ethyl ketone | 994 |

After 45,000 copies the fuser roll prepared according to this invention showed no evidence of hot offset and the infrared absorption per square millimeter was 0. Furthermore, a fuser roll prepared according to this procedure but without $\alpha,\omega$-aminopropyl terminated polydimethylsiloxane oligomer, had an infrared absorption per square millimeter of 1. This clearly demonstrates the superiority of fuser rolls containing cured fluoroelastomers having pendant polydiorganosiloxane segments according to this invention.

EXAMPLE 3

Example 2 was repeated except that a α,ω-aminopropyl-terminated dimethylsiloxane oligomers of varying molecular weight and concentrations were used to form the fusing rolls. 5 grams of an α,ω-aminopropyl polydimethylsiloxane oligomer having a number average molecular weight of 14,000 was used to form one roll while an α,ω-aminopropyl polydimethylsiloxane oligomer having a number average molecular weight of 8,000 was used at concentrations of 2.5, 5, 7.5, 10 and 15 grams in five other rolls. The six fuser rolls exhibit excellent toner release and the life of each of the rolls is comparable to the roll described in Example 2 which was prepared according to this invention.

EXAMPLE 4

The outer layer on a fuser roll of this invention exhibits low surface energy which provides a surface that is abhesive to toner materials. To illustrate this feature of the invention, fluoroelastomer compositions were prepared according to Example 2 using α,ω-aminopropyl-terminated polydimethylsiloxane oligomers of different number average molecular weight and at varying concentrations. Each of the compositions were spray coated on a flat surface and water contact angle measurements were made on the coatings after curing. The results are set forth in the following table.

TABLE

| Composition | Molecular Weight of Oligomer | Concentration of Oligomer (weight %, Composition) | Water Contact Angle, Degrees Relative to Control |
| --- | --- | --- | --- |
| Control | none | none | — |
| 1 | 8,000 | 1 | +15 |
| 2 | 8,000 | 5 | +40 |
| 3 | 8,000 | 10 | +51 |
| 4 | 2,500 | 5 | +45 |
| 5 | 14,000 | 5 | +40 |

The above data shows that the incorporation of the oligomer segments into the fluoroelastomer according to this invention, provides a surface having improved release properties. Thus, the higher the contact angle, the lower the surface energy of the coating, and the better its surface release properties.

The coatings prepared with the Control Composition and Compositions 1 and 2 were also evaluated for toner release. This was done by placing approximately 0.5 grams of the yellow toner particles described in Example 1 on the cured coatings prepared from the aforementioned three compositions. The toner particles were baked for one hour at 175° C. (the fusing temperature of the particles), cooled and peeled from the coatings. The fused toner was much more difficult to peel from the coating prepared from the Control in comparison to those coatings prepared from Compositions 1 and 2.

Although the invention has been described in detail with particular reference to certain preferred embodiments thereof, it should be appreciated that variations and modifications can be affected within the spirit and scope of the invention.

We claim:

1. A roll comprising a cylindrical core having an outer layer comprising cured fluoroelastomer having pendant polydiorganosiloxane segments that are convalently bonded to the backbone of the fluoroelastomer and have a number average molecular weight in the range of about 1,000 to 20,000.

2. A fuser roll of claim 1 useful in electrostatography for fusing heat-softenable toner material to a substrate wherein the outer layer provides a release surface abhesive to said material.

3. A fuser roll of claim 2, wherein the fluoroelastomer is a polymer of an ethylenically unsaturaged fluorohydrocarbon.

4. A fuser roll of claim 2, wherein the fluoroelastomer is a copolymer of vinylidene fluoride with hexafluoropropylene or vinylidene fluoride with hexafluoropropylene and tetrafluoroethylene.

5. A fuser roll of claim 2, wherein the polydiorganosiloxane segments have a number average molecular weight in the range of about 2,000 to 15,000.

6. A fuser roll of claim 5, wherein the polydiorganosiloxane segments are covalently bonded to the backbone of the fluoroelastomer by reaction with a polydimethylsiloxane containing at least one amino propyl group.

7. A fuser roll of claim 6, wherein the polydimethylsiloxane is an α,ω-bis(aminopropyl)-polydimethylsiloxane.

8. A fuser roll of claim 6, wherein the fluoroelastomer is a copolymer of vinylidene fluoride with hexafluoropropylene and the polydimethylsiloxane segments have a number average molecular weight in the range of about 2,000 to 15,000.

9. A fuser roll of claim 7, wherein the fluoroelastomer is a copolymer of vinylidene fluoride with tetrafluoroethylene.

10. A fuser roll of claim 2, wherein the layer further comprises a filler.

11. A fuser roll of claim 10, wherein the filler in a metal-containing filler.

12. A fuser roll of claim 11, wherein the filler is a metal, metal alloy, metal oxide or metal salt.

13. A fuser roll of claim 12, wherein the metal is copper, tin, silver, zinc, aluminum, iron, lead, platinum, gold, beryllium, nickel, chromium, iridium, ruthenium, tungsten, cadmium or vanadium.

14. A fuser roll of claim 12, wherein the filler is present in a concentration in the range of about 10 to 100 percent, by weight, based on the fluoroelastomer.

15. A fuser roll of claim 12, wherein the filler is lead oxide.

* * * * *